US012723713B2

(12) United States Patent
Bernhardt

(10) Patent No.: US 12,723,713 B2
(45) Date of Patent: Sep. 1, 2026

(54) TANK FOR STORING LIQUEFIED GAS AND FLUID TRANSFER METHOD

(71) Applicant: L'Air Liquide, Societe Anonyme pour l'Etude et l'Exploitation des Procedes Georges Claude, Paris (FR)

(72) Inventor: Jean-Marc Bernhardt, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 148 days.

(21) Appl. No.: 18/712,319

(22) PCT Filed: Nov. 24, 2022

(86) PCT No.: PCT/EP2022/083077
§ 371 (c)(1),
(2) Date: Dec. 2, 2024

(87) PCT Pub. No.: WO2023/094500
PCT Pub. Date: Jun. 10, 2023

(65) Prior Publication Data

US 2025/0164074 A1 May 22, 2025

(30) Foreign Application Priority Data

Nov. 25, 2021 (FR) ........................................ 2112527

(51) Int. Cl.
*F17C 1/12* (2006.01)
*F17C 3/08* (2006.01)
*F17C 13/00* (2006.01)

(52) U.S. Cl.
CPC ................ *F17C 3/08* (2013.01); *F17C 13/00* (2013.01); *F17C 2203/0391* (2013.01); *F17C 2203/0629* (2013.01); *F17C 2221/012* (2013.01); *F17C 2223/0153* (2013.01)

(58) Field of Classification Search
CPC .......... F17C 2223/041; F17C 2265/034; F17C 2270/0171; B65D 77/225
USPC .......................................................... 220/563
See application file for complete search history.

(56) References Cited

U.S. PATENT DOCUMENTS

| | | | | |
|---|---|---|---|---|
| 4,427,045 A * | 1/1984 | Headrick | B65D 90/52 220/721 |
| 7,581,405 B2 | 9/2009 | Higginbotham et al. | |
| 2009/0071174 A1 | 3/2009 | Hylands et al. | |
| 2012/0060515 A1 | 3/2012 | Feger | |

(Continued)

OTHER PUBLICATIONS

International Search Report and Written Opinion for PCT/EP2022/083077, mailed Mar. 31, 2023.
French Search Report for FR 2 112 527, mailed Jul. 7, 2022.

*Primary Examiner* — Stephen J Castellano
(74) *Attorney, Agent, or Firm* — Justin K. Murray

(57) ABSTRACT

The invention relates to a tank for storing liquefied gas, in particular liquefied hydrogen, the tank comprising a sealed shell that defines a storage space between a lower end and an upper end, the tank comprising a circuit that is fluidically connected to the storage space for filling with and/or drawing off fluid, characterized in that the tank comprises, in the storage space, a set of walls forming a trough that is located in the upper portion of the storage space and is open in the direction of the upper end of the storage space.

15 Claims, 5 Drawing Sheets

(56) References Cited

U.S. PATENT DOCUMENTS

| | | | | |
|---|---|---|---|---|
| 2013/0008185 | A1 | 1/2013 | Newman et al. | |
| 2020/0182409 | A1 * | 6/2020 | Lansky | F17C 9/00 |

* cited by examiner

[Fig. 1]
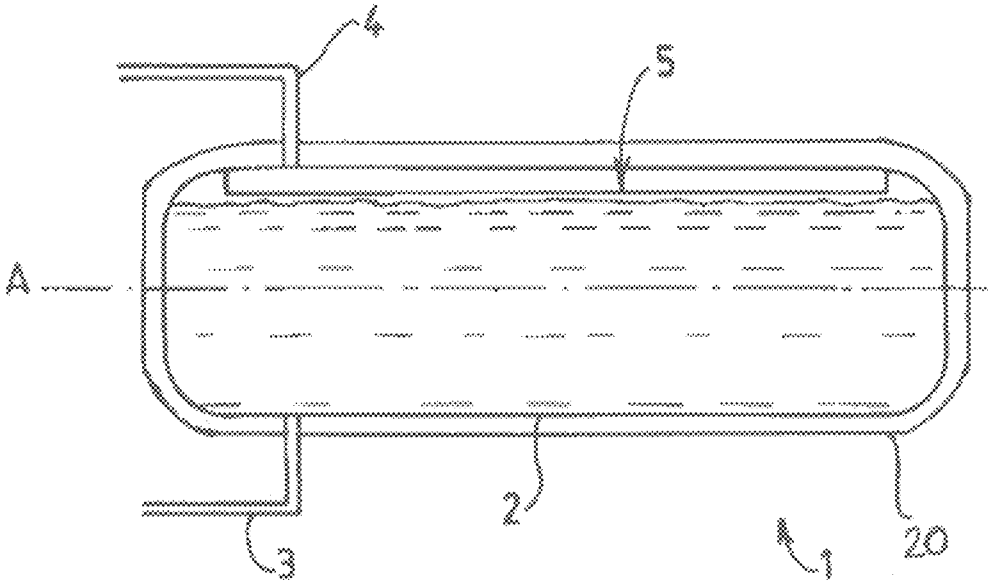
[Fig. 2]
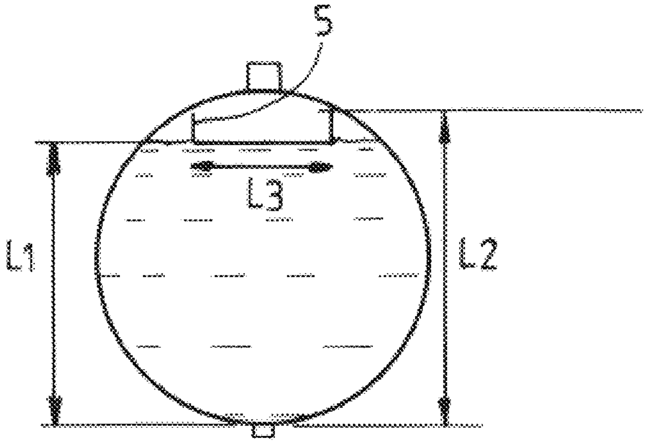

[Fig. 3]
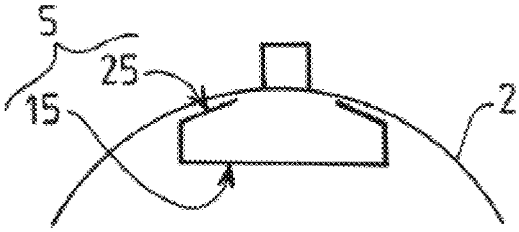
[Fig. 4]
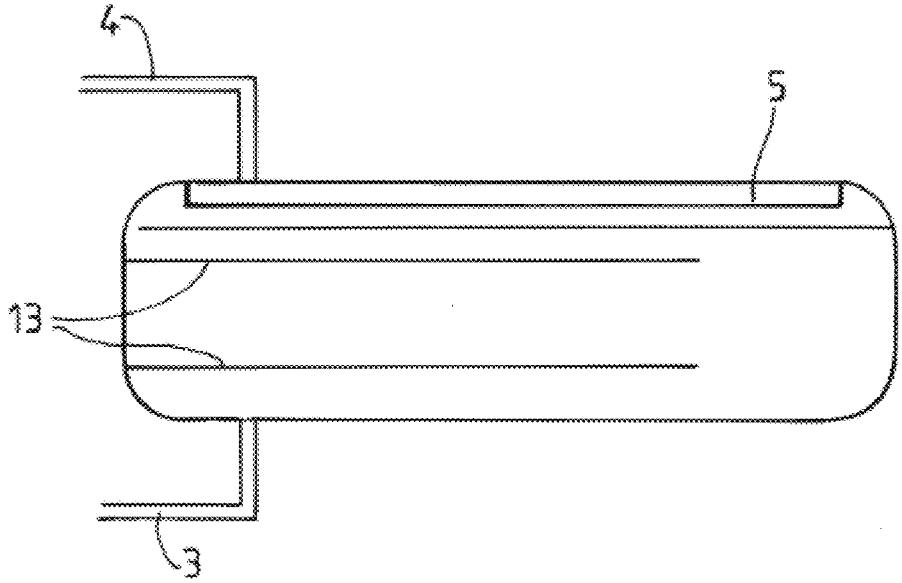

[Fig. 5]
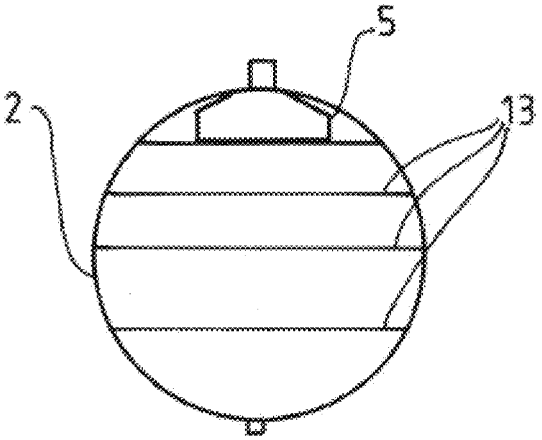
[Fig. 6]
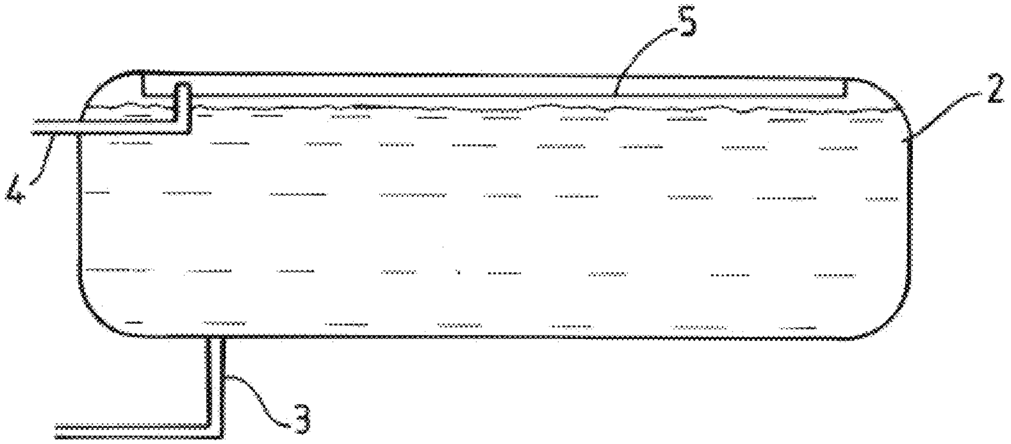

[Fig. 7]
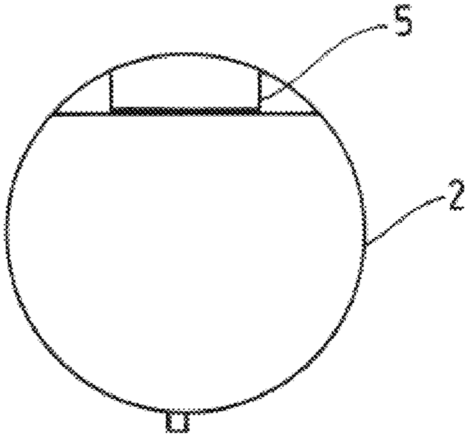
[Fig. 8]
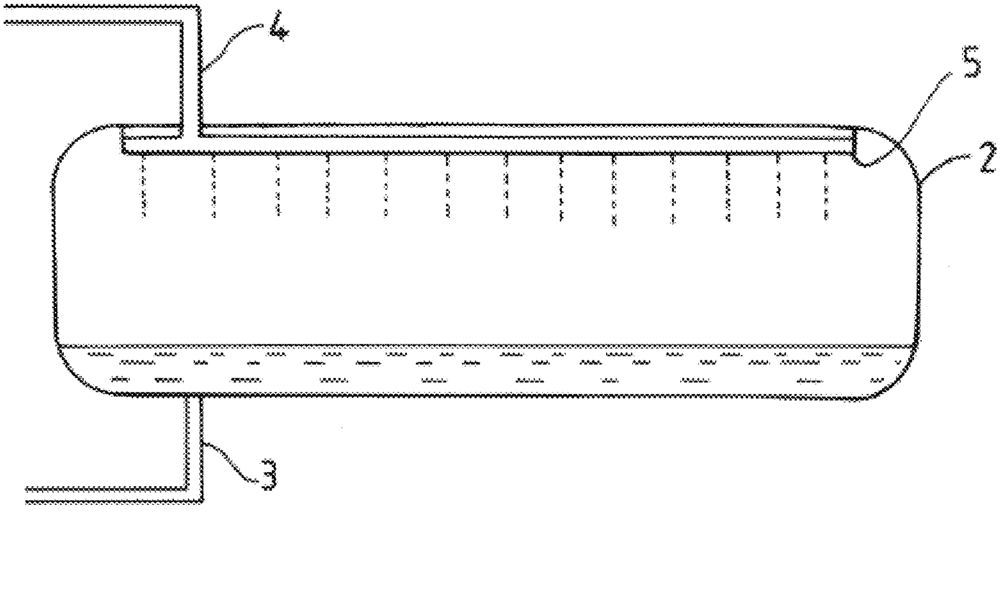

[Fig. 9]
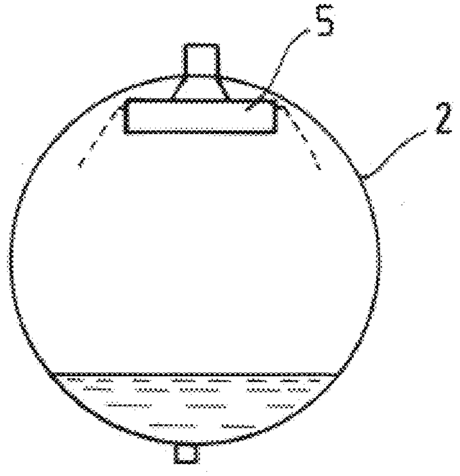

TANK FOR STORING LIQUEFIED GAS AND FLUID TRANSFER METHOD

CROSS REFERENCE TO RELATED APPLICATIONS

This application is a § 371 of International PCT Application PCT/EP2022/083077, filed Nov. 24, 2022, which claims the benefit of FR2112527, filed Nov. 25, 2021, both of which are herein incorporated by reference in their entireties.

FIELD OF THE INVENTION

The invention relates to a tank for storing liquefied gas and a fluid transfer method.

The invention relates more specifically to a tank for storing liquefied gas, in particular liquefied hydrogen, comprising a fluidtight shell delimiting a storage volume between a lower end and an upper end, the tank comprising a circuit fluidically linked to the storage volume for filling and/or withdrawing fluid.

BACKGROUND OF THE INVENTION

The low density of liquid hydrogen compared with water, for example, limits the pressure available through hydrostatic head. At low temperature, this can result in fairly high losses by evaporation during transfers. Systems for delivering and storing liquid hydrogen can cause losses that can range to up to 15% of production.

Transporting a subcooled liquid requires precautions to ensure that the pressure in the movable tank does not drop below atmospheric pressure (which would be dangerous in terms of the mechanical strength of the tank or the ingress of air into the transported fluid).

Truck tanks filled with liquid must be pressurized in order to deliver the liquid hydrogen to the receiving storage facility (this storage facility is usually kept under pressure to ensure the operation of a liquid pump or the supply of pressurized hydrogen). This pressurization is usually carried out by evaporation and reheating of hydrogen in the tank of the truck (pressure building unit or PBU). This therefore introduces energy into the tank.

Once the liquid has been delivered to the first receiving storage facility, the tank can go on to fill another station or return to the liquid source for resupply. The movement of the truck will allow a pressure reduction inside the tank by virtue of the movement of the liquid and contact with the vapor phase. The resulting pressure will always be greater than the initial pressure on account of the addition of energy to the system.

Ultimately, the number of deliveries and the necessary pressure for these receiving stations will determine the amount of hydrogen lost or to be reliquefied in the liquefier after the round trip.

When pressure is being released from a cryogenic-liquid tank to another item of equipment, various case scenarios can result, notably:

- the reduction in pressure inside the tank can cause the liquid to evaporate (bubbles in the liquid) if it is in equilibrium with the vapor, this evaporation tending to homogenize the temperature of the liquid (anti-stratification),
- the mass to be extracted from the tank in order to reduce the pressure is directly linked to the temperature of the vapor leaving the tank (the colder the vapor, the greater the density and the greater the mass to be extracted for the same variation in pressure).

Similarly, when a cryogenic-liquid tank is being pressurized by introducing heat or by transfer from another tank, various case scenarios can result, notably:

- the more the vapor stratifies above the liquid, the faster the pressure inside the tank rises (reduction in the density of the vapor when the temperature rises),
- for an identical rise in pressure, it is necessary to inject a larger mass of cold vapor (equilibrium temperature) than mass of "hot" vapor in relation to the density of the gas.

When a cryogenic-liquid tank is being filled by liquid from another tank, various case scenarios can result, notably:

- the more the vapor is stratified above the liquid, the faster the pressure rises when filling from the bottom of the tank without extracting vapor from the top,
- the colder the liquid is than the vapor present in the storage facility, the greater the drop in pressure when the storage facility is being filled from the top (for example raining).

Furthermore, when a cryogenic-liquid tank is being drained, various case scenarios can result:

- the further the liquid is from equilibrium (subcooled), the faster the pressure drops when the tank is being drained without adding vapor to the top; otherwise, evaporation takes place as in the event of depressurization,
- the further the temperature of the vapor is from equilibrium, the more the mass of vapor to be added drops when the tank is being drained by adding vapor to the top.

In summary, the optimum configurations of the vapor and liquid phases for the different operations involving a tank may be summarized as follows:

During depressurization: stratified vapor and subcooled liquid.

During filling: stratified vapor and subcooled liquid.

During full storage/transportation: non-stratified vapor and subcooled liquid.

During intermediate or empty storage or transportation: stratified vapor and subcooled liquid.

During pressurization: stratified vapor and subcooled liquid.

During drainage: stratified vapor and subcooled liquid.

Only the storage and/or transport phase of a full tank would require there to be equilibrium (lack of stratification) in the vapor phase in order to avoid a significant rise in pressure over this small volume of vapor. The liquid is always better stratified and subcooled with respect to the equilibrium temperature at the pressure in the storage facility.

One aim of the present invention is to overcome all or some of the disadvantages of the prior art that are set out above.

SUMMARY OF THE INVENTION

For this purpose, the tank according to certain embodiments of the invention, may include, in the storage volume, a set of walls forming a bowl in the upper part of the storage volume that is open toward the upper end of the storage volume.

This structure enables the tank to simultaneously maintain a pressure above atmospheric pressure and a temperature of the stratified subcooled liquid despite any movement of the liquid caused by transportation of the tank.

The proposed solution also facilitates pressurization and filling operations for these storage facilities.

The transportation tanks are usually filled to 90% (and a maximum of 95% with liquid) to leave a space for the vapor in the event of a natural pressure increase in the tank (ingress of heat). This is because the density of the liquid drops as the pressure rises, and the space occupied by the same mass of liquid increases. The level therefore tends to increase as the pressure increases without withdrawing vapor from the tank. Transportation regulations prohibit liquid from being discharged through the safety members when the tank is being moved. The maximum level is therefore limited by these conditions.

Furthermore, the embodiments of the invention may have one or more of the following features:

- the volume delimited by the bowl is in communication with the rest of the storage volume of the tank at least at an upper edge of the bowl,
- the volume delimited by the bowl is in communication with the rest of the storage volume of the tank via an interstice having a height of between 1 mm and 50 mm,
- the volume delimited by the bowl is between 2% and 15% of the volume delimited by the shell,
- the set of walls forming the bowl comprises a wall defining the bottom of the bowl, said bottom being located at a first height in the shell corresponding to 75% and 95% of the height of the shell,
- the first height corresponds to a liquid filling level for the shell (2) of between 80% and 98% of the storage volume, and preferably between 90% and 95%,
- the set of walls forming the bowl comprises at least one wall defining the upper edge of the bowl, said upper edge being located at a second height in the shell corresponding preferably to 80% and 98% of the height of the shell,
- at least a part of the upper edge of the bowl is vertical and/or oriented toward the central part of the bowl,
- the tank comprising one or more deflecting walls in the storage volume that are offset in a main direction that is perpendicular to the height to force the fluid to travel at least one round-trip in this main direction when passing between the lower end and the upper end of the storage volume,
- at least some of the deflecting walls are located in the lower half of the storage volume to be immersed in the liquid phase of the liquefied gas when the tank contains liquefied gas,
- the deflecting wall or walls are made of flexible material, in particular which is more lightweight than the material from which the shell is made,
- the shell extends in a main direction that is horizontal in the usage configuration of the tank, the bowl extending in this main direction,
- at least a part of the set of walls forming the bowl is made of flexible material, in particular which is more lightweight than the material from which the shell is made,
- the circuit comprises a first transfer line opening into the bowl,
- the first transfer line opening into the bowl passes through the storage volume of the shell beneath the bowl.

The invention also relates to a method for transferring fluid into a tank according to any one of the features above or below, comprising at least one of the following steps: a step of filling the tank with liquid via the first line, a step of transferring gas into the tank via the first line, a step of withdrawing gas from the tank via the first line.

The invention may also relate to any alternative device or method comprising any combination of the features above or below within the scope of the claims.

BRIEF DESCRIPTION OF THE DRAWINGS

The invention will be understood better from reading the following description and from studying the accompanying figures. These figures are given only by way of illustration and do not in any way limit the invention.

Other features and advantages are set out in the description below, provided with reference to the figures in which:

FIG. 1 is a schematic partial longitudinal view in cross section of a possible example embodiment of a tank according to the invention, FIG. 2 is a schematic partial view in cross section of the tank in [FIG. 1], FIG. 3 is a schematic partial view in cross section showing a detail of a tank according to another embodiment, FIG. 4 is a schematic partial longitudinal view in cross section of another possible example embodiment of a tank according to the invention, FIG. 5 is a schematic partial view in cross section of the tank in [FIG. 4], FIG. 6 is a schematic partial longitudinal view in cross section of another possible example embodiment of a tank according to the invention, FIG. 7 is a schematic partial view in cross section of the tank in [FIG. 6], FIG. 8 is a schematic partial longitudinal view in cross section of the example embodiment in [FIG. 1] in a filling phase, FIG. 9 is a schematic partial view in cross section of the tank in [FIG. 8].

DETAILED DESCRIPTION OF THE INVENTION

The liquefied gas storage tank 1 illustrated is for example intended to store liquefied hydrogen. This tank 1 may in particular be a movable delivery tank, for example carried by a truck or a truck trailer.

The tank 1 comprises a fluidtight shell 2 delimiting a storage volume between a lower end and an upper end. This shell 2 may be surrounded by a second shell 20 with a thermally insulated space, for example under vacuum (shown only in [FIG. 1] for the sake of simplicity).

The tank 1 comprises a circuit 3, 4 fluidically linked to the storage volume for filling and/or withdrawing fluid.

For example, the shell 2 may be generally cylindrical and extend in a main direction A that is horizontal in the usage configuration of the tank 1. The tank is therefore for example referred to as a "horizontal" tank.

According to an advantageous feature, the tank 1 comprises, in the storage volume, a set of walls 15, 25 forming a bowl 5 in the upper part of the storage volume that is open toward the upper end of the storage volume.

In other words, the top of the tank 1 comprises a bowl 5 (or vat) configured to prevent or limit contact between the liquid and the vapor at the top of the storage facility, even when the tank is moving. This means that the walls of the bowl 5 isolate or separate the gas located in the bowl from the liquid located below.

The bowl 5 preferably extends in this main direction A.

As shown in [FIG. 1], this bowl 5 may be closed at least at one of the ends thereof (for example at the longitudinal ends by means of a fluidtight connection with the shell 2, for example by welding). The bowl 5 may keep at least one opening in communication with the rest of the volume of the shell 5, for example at the longitudinal edges thereof, along the upper wall of the tank 1.

The volume delimited by the bowl 5 is then in communication with the rest of the storage volume of the tank at least at an upper edge of the bowl 5.

The volume delimited by the bowl 5 is for example in communication with the rest of the storage volume of the tank 1 via an interstice having a height of between 1 mm and 50 mm.

For example, in a direction perpendicular to the height, the volume delimited by the bowl 5 is in communication with the rest of the storage volume of the tank via an interstice having a length of between 50% and 95% of the length of the shell 2 and preferably between 70% and 90% of the length.

The volume delimited by the bowl 5 may be between 2% and 15% of the volume delimited by the shell 2.

As illustrated, the set of walls forming the bowl 5 may comprise a wall 15 defining the bottom of the bowl (that is for example flat and horizontal). Preferably, this bottom is located at a first height L1 of the shell 2 corresponding to xx % and UU % of the height of the shell 2. For example, this first height L1 may correspond to a liquid filling level for the shell 2 of between 80% and 98% of the total storage volume, and preferably between 90% and 95%. This means that the first height L1 may be determined to enable 90% or 95% of the storage volume to be filled with liquid.

The set of walls forming the bowl 5 further comprises at least one wall 25 defining the upper edge of the bowl 5 from the bottom. This upper edge is preferably located at a second height L2 in the shell 2 and preferably corresponds to 80% and 98% of the height of the shell 2. The second height L2 may be determined according to the geometry of the tank. This enables the second height L2 to be maximized by adding edges to the top of the bowl. When the tank is full, the stratification of the liquid may also be conserved using horizontal or near-horizontal walls.

At least a part of the wall forming the upper edge of the bowl 5 may be vertical (see [FIG. 2]) or flared toward the outside of the bowl, or folded toward the central portion of the bowl (see [FIG. 3]).

This structure enables the pressure inside the tank 1 to be kept above atmospheric pressure, even if the temperature of the subcooled liquid would in theory permit a reduction in this pressure on account of condensation of the vapor phase. The level of the liquid can reach the first height L1 without affecting the pressure in the tank, even when movements of the tank create waves on the free surface.

The pressure is only affected when the level reaches the second height L2, where a part of the liquid could flow into the bowl 5, retaining and partially condensing the vapor.

The width L3 of the bowl is preferably determined to define the required gas volume during transportation of the tank 1.

This solution also advantageously enables replacement of the anti-sloshing walls conventionally installed in movable tanks. This is because the limitation of the mass of liquid that can be set in motion by the horizontal walls automatically reduces the liquid sloshing effect upon sudden movements.

As illustrated, the circuit may comprise a first fluid transfer line 4 (liquid and/or gas) opening into the bowl 5 for filling and/or withdrawing. For example, a vapor outlet tap may be located inside this bowl 5, close to one of the (longitudinal) ends. A second line 3 may be provided to open into the lower part of the shell 2.

As illustrated, the first line 4 may open into the bowl 5 through the bottom thereof, passing through the storage volume of the tank positioned beneath the bowl 5.

During a filling phase of the tank, the bowl 5 may act as a liquid distributor when filling from the top. The liquid may be conveyed into the bowl 5 (see [FIG. 8]).

The bowl 5 is filled with liquid before overflowing into the vapor phase of the tank below. This can distribute the liquid onto the high walls of the tank and also through the vapor phase, which may condense when it comes into contact with the subcooled liquid. This system may advantageously replace an injection rail in the gas part without entailing additional pressure losses.

An incline may be provided in the bowl 5 toward the end of the tank opposite the liquid inlet to distribute the liquid over the entire surface or length of the bowl and of the tank.

During a pressurization phase of the tank 1, relatively hot gas can be conveyed by the first line 4 to the top and can enable the pressure in the tank to increase. This hot gas may be generated by the vaporization of liquid in an exchanger or using other gas sources. The proposed solution limits the dispersion of hot gas toward the bottom of the tank and toward the liquid by conveying it into the bowl 5. This means that only the top of the tank and the bowl 5 are heated during this operation (or are more heated than the rest).

During a depressurization phase, the reduction in pressure (in particular following drainage of the tank) may also be improved if the temperature stratification is maintained using this device. This is because the hot gas withdrawn from the bowl 5 leaves the tank first, while the cold gas coming from the bottom cools the vat and the walls before exiting via the pipes 4. Some of the energy injected during pressurization is then discharged from the tank using this device. To achieve the same residual pressure, the amount of gas withdrawn from the tank is relatively small.

As illustrated in [FIG. 4] and [FIG. 5], the tank 1 may also comprise one or more deflecting walls 13 in the storage volume that are offset in a longitudinal main direction A to force the fluid to travel at least one round-trip in this main direction A when passing between the lower end and the upper end of the storage volume 2. At least some of the deflecting walls 13 may be located in the lower half of the storage volume to be immersed in the liquid phase of the liquefied gas when the tank contains liquefied gas.

In potential configurations:

- the deflecting walls 13 extend over part of the storage volume in the main direction A from one end of the shell 2,
- the deflecting walls 13 are horizontal or substantially horizontal in the usage configuration of the tank 1,
- the deflecting walls 13 extend horizontally through the entire cross section of the storage volume,
- the tank has an odd number of deflecting walls 13, in particular three deflecting walls 13,
- the tank has a filling and/or withdrawal orifice located in the lower part of one longitudinal end of the shell 2,
- the tank has a filling and/or withdrawal orifice located in the upper part of one longitudinal end of the shell 2,
- the tank has a fluid filling or withdrawal orifice located at one longitudinal end and at an intermediate height between the upper and lower parts of the storage volume,
- at least some of the deflecting walls 13 are made of flexible material, in particular which is more lightweight than the material from which the shell 2 is made, in a plane transversal to the main direction A, the bowl 5 is centered, i.e. positioned centrally in relation to the median vertical axis that separates the tank into two volumetric halves, the bowl may also be longitudinally and/or transversely symmetrical (for example about a plane parallel to the main direction A and/or about a plane perpendicular to the main direction A), the height of the interstice between the upper end of the bowl and the upper wall of the fluidtight shell is not constant in the main direction (for example this height increases further away from the gas feed, i.e. the location where the first transfer line opens into the bowl), enabling a better distribution of the fluid.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A movable tank for storing and delivering liquefied gas, the movable tank comprising a fluid tight shell delimiting a storage volume between a lower end and an upper end, the fluid tight shell extending in a main direction that is horizontal when the tank is in usage configuration, the fluid tight shell being surrounded by a second shell with a thermally insulated space under vacuum; and a circuit fluidically linked to the rage volume for filling and/or withdrawing fluid, wherein the movable tank further comprises, in the storage volume, a set of walls forming a bowl that is located in r pa storage volume and open toward the upper end of the storage volume, wherein the bowl extends in the main direction, wherein the volume delimited by the bowl is in communication with the rest of the storage volume of the tank at least at an upper edge of the bowl, wherein at least a part of the set of walls forming the bowl is made of a flexible material.

2. A movable tank for storing and delivering liquefied gas, the movable tank comprising:

a fluid tight shell delimiting a storage volume between a lower end and an upper end, the fluid tight shell extending in a main direction that is horizontal when the tank is in usage configuration, the fluid tight shell being surrounded by a second shell with a thermally insulated space under vacuum; and a circuit fluidically linked to the storage volume for filling and/or withdrawing fluid, wherein the movable tank further comprises, in the storage volume, a set of walls forming a bowl that is located in an upper part of the storage volume and open toward the upper end of the storage volume, wherein the bowl extends in the main direction, wherein the volume delimited by the bowl is in communication with the rest of the storage volume of the tank at least at an upper edge of the bowl, wherein the volume delimited by the bowl is between 2% and 15% of the volume delimited by the fluid tight shell.

3. The tank as claimed in claim 2, wherein the volume delimited by the bowl is in communication with the rest of the storage volume of the tank via an interstice having a height of between 1 mm and 50 mm.

4. The tank as claimed in claim 2, wherein the set of walls forming the bowl comprises a wall defining the bottom of the bowl, said bottom being located at a first height in the fluid tight shell between 75% and 95% of the height of the fluid tight shell.

5. The tank as claimed in claim 4, wherein the first height corresponds to a liquid filling level for the fluid tight shell of between 80% and 98% of the storage volume.

6. The tank as claimed in claim 2, wherein the set of walls forming the bowl comprises at least one wall defining the upper edge of the bowl, said upper edge being located at a second height in the fluid tight shell corresponding to 80% and 98% of the height of the fluid tight shell.

7. The tank as claimed in claim 6, wherein at least a part of the upper edge of the bowl is vertical and/or oriented toward the central part of the bowl.

8. The tank as claimed in claim 2, wherein the tank comprising one or more deflecting walls in the storage volume that are offset in a main direction that is perpendicular to the height to force the fluid to travel at least one round-trip in this main direction when passing between the lower end and the upper end of the storage volume.

9. The tank as claimed in claim 8, wherein at least some of the deflecting walls are located in the lower half of the storage volume to be immersed in the liquid phase of the liquefied gas when the tank contains liquefied gas.

10. The tank as claimed in claim 8, wherein the deflecting wall or walls are made of flexible material.

11. The tank as claimed in claim 2, wherein the circuit comprises a first transfer line opening into the bowl.

12. The tank as claimed in claim 11, wherein in that the height of the interstice between the upper end of the bowl and the upper wall of the fluid tight shell is not constant in the main direction.

13. The tank as claimed in claim 2, wherein, in a plane transversal to the main direction, the bowl is centered.

14. A method for transferring fluid into a tank as claimed in claim 2, comprising at least one of the following steps: a step of filling the tank with liquid via a first transfer line, a step of transferring gas into the tank via the first transfer line, a step of withdrawing gas from the tank via the first transfer line.

15. The tank as claimed in claim 2, wherein the circuit comprises a transfer line opening into the bowl, and wherein the bowl is configured to receive gas from the transfer line to pressurize the tank while limiting dispersion of the gas toward liquid located in the storage volume below the bowl.

* * * * *